E. MARTIN.
PROCESS FOR THE MANUFACTURE OF WIRES AND TUBES OF TWO METALS.
APPLICATION FILED FEB. 13, 1919.
1,341,812. Patented June 1, 1920.
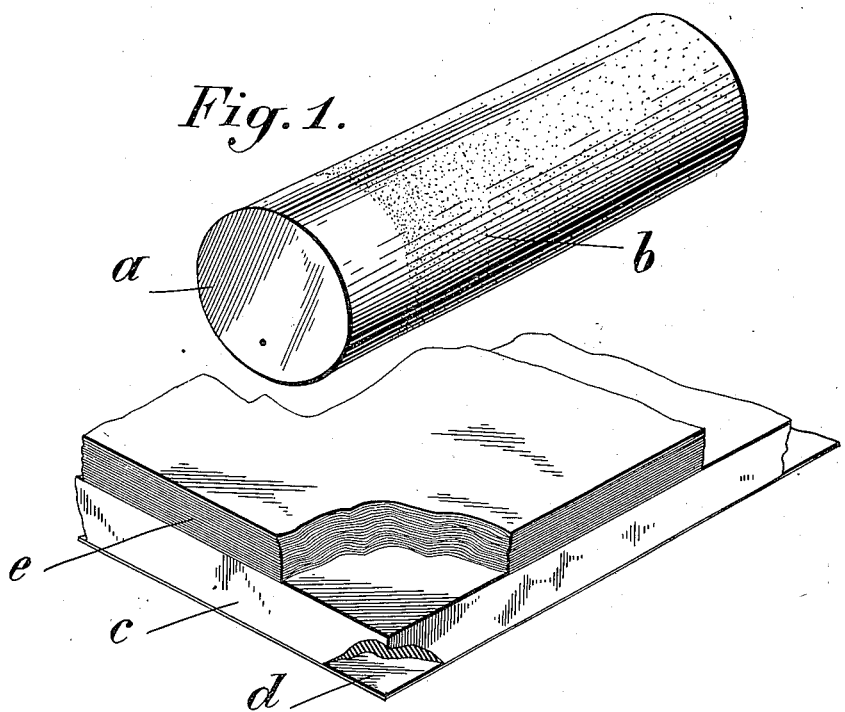
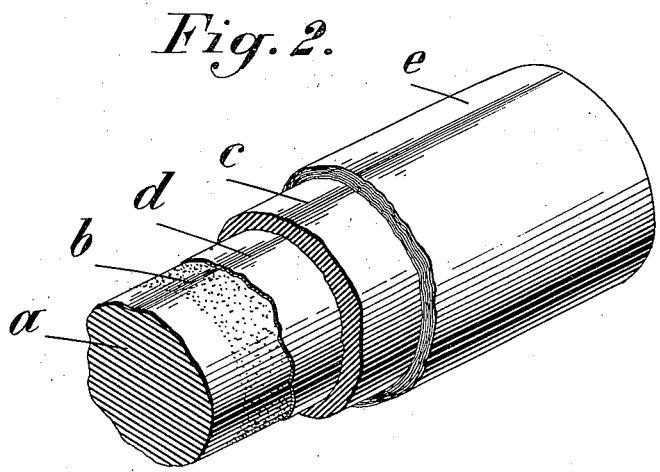

UNITED STATES PATENT OFFICE.

EDOUARD MARTIN, OF BRUSSELS, BELGIUM, ASSIGNOR TO COMPAGNIE BELGE DU BI-METAL, SOCIÉTÉ ANONYME, OF BRUSSELS, BELGIUM, A CORPORATION OF BELGIUM.

PROCESS FOR THE MANUFACTURE OF WIRES AND TUBES OF TWO METALS.

1,341,812. Specification of Letters Patent. Patented June 1, 1920.

Application filed February 13, 1919. Serial No. 276,831.

*To all whom it may concern:*

Be it known that I, EDOUARD MARTIN, a citizen of the French Republic, residing at Abbaye de Forest, Brussels, in the Kingdom of Belgium, have invented certain new and useful Improvements in Processes for the Manufacture of Wires and Tubes of Two Metals, of which the following is a specification.

This invention has for its object a process of manufacture of wires and tubes of composite metal intended to replace the ordinary wires of commerce such as galvanized, tinned, brass covered wires, wires of nickel, German silver, silver, etc., and the tubes, such as those employed for the manufacture of bedsteads and other furniture, which, at the present time, are made by drawing a tube of brass on to a tube of steel and can be neither bent nor curved without the brass covering separating from the tube of steel.

By the present process the proportion of the metal of the covering of copper, brass or any other usual alloy may be reduced to 6, 5, 4 and even 3 per cent. of the steel of which the core of the wires or the tubes is made and these may be externally of any desired metal or color, such as copper, brass, tombac, nickel, silver, etc.

To carry out the process solid or hollow billets of steel are taken according as it is desired to manufacture tubes or wires. These billets may measure for example from 50 cm. to 1 meter in length by 110 mm. in diameter or more. After their surface has been carefully ground, they are subjected to a degreasing by means of potash and to a coppering bath.

On the other hand a mass of copper is taken which is hammered, polished and rolled hot so as to obtain a very sound metal in the form of a plate of 300 by 500 mm. having a thickness of 35 mm. for example.

To one face of this plate is applied a sheet of a composite metal composed of copper and brass specially prepared to form a brazing between the copper and the steel and on the other face are placed thin sheets of metals or alloys such as copper, brass, tombac, nickel, etc., the choice of which is determined by the color it is desired to give to the exterior of the wire or tube.

The whole is welded in the hydraulic press, then rolled hot down to a thickness of from 10 to 15 mm. and cut out into disks of about 50 cm. in diameter which are transformed by stamping into tube blanks the inner wall of which is constituted by the sheet intended to form the brazing. The tubes are drawn down to an internal diameter corresponding to the diameter of the billets of steel, say for example 110 mm. and to the thickness desired to produce the proportion of 3, 4, 5 or 6 per cent. of copper, brass, etc., relatively to the steel. These tubes are then cut to the length of the billets of steel and these latter introduced into them. The whole is then reheated in a plate heating furnace and afterward subjected to hydraulic pressure in a matrix which strongly compresses the tube or jacket of copper on to the steel core and welds them together.

In the accompanying drawing, Figure 1 is a view showing the relation of the several plates and sheets prior to their being welded together; Fig. 2 illustrates the sheets formed into a tube about the steel billet.

Referring to the drawing *a* is the steel billet, shown partly covered with an electro-deposit of copper *b*. A sheet of composite metal, *d*, specially prepared to form the brazing between the steel and the copper is placed against one face of the copper plate and *e* designates the sheets of metals or alloys with which the copper plate is covered, the nature of said plates depending upon the color it is desired to give the wire or tube to be formed.

When solid steel billets intended for the manufacture of wire are to be dealt with, the billet and its jacket are above simply pressed together as just stated then on leaving the matrix the welded piece is subjected to hot rolling until it is reduced to bars of 45 mm. in diameter for example; after which these bars are drawn down into wires of from 5 to 6 mm. in diameter which are wire drawn and subjected to annealing like copper or brass wires.

If hollow steel billets for the manufacture of tubes are to be dealt with, there is introduced into them, before the welding on of the jacket by compression, a perfectly cylindrical steel bar to prevent its deformation. This steel bar is withdrawn after the operation and the welded piece is reheated and rolled on a cold mandrel until it is transformed into a tube of from 3 to 4 mm. in thickness.

This tube is annealed, scraped and by successive drawings it can be reduced to the usual dimensions of the tubes of commerce.

What I claim and desire to secure by Letters Patent of the United States is:—

1. Process for the manufacture of wires and tubes of composite metal which consists in nesting a billet of steel into a jacket of the covering metal lined internally with a composite metal sheet adapted to form a brazing, welding the billet and jacket together by compression, and rolling and finishing the resulting blank.

2. Process for the manufacture of wires and tubes of composite metal which consists in nesting a billet of steel into a jacket formed by stamping a plate of the covering metal, having on one face a sheet of a composite metal of copper and brass specially prepared to form a brazing, welding the billet and jacket together by compression, and rolling and finishing the resulting blank.

3. Process for the manufacture of wires and tubes of composite metal which consists in nesting a billet of steel into a jacket of the covering metal lined internally with a composite metal sheet adapted to form a brazing and the outside of which is covered with thin superimposed metal sheets, welding the billet and jacket together by compression, and rolling and finishing the resulting blank.

4. Process for the manufacture of wires and tubes of composite metal which consists in nesting a billet of steel into a jacket formed by stamping a plate of the covering metal to the opposite faces of which have been welded, respectively, a sheet of a composite metal, of copper and brass specially prepared to form a brazing between the billet and the jacket, and a plurality of superimposed thin metal sheets, welding together the billet and the jacket by compression, and rolling and finishing the resulting blank.

In testimony whereof I have affixed my signature in presence of two witnesses.

EDOUARD MARTIN.

Witnesses:
B. V. Y. HILPATRICK,
F. Y. ZALANS.